Feb. 16, 1971 W. H. DEIERHOI, JR 3,563,805
THIN, FLAT PRIMARY CELLS AND BATTERIES
Filed Feb. 20, 1969 2 Sheets-Sheet 1
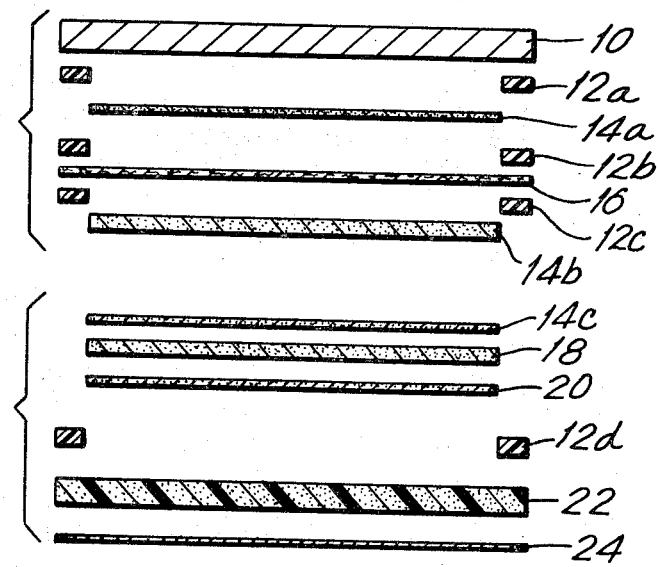
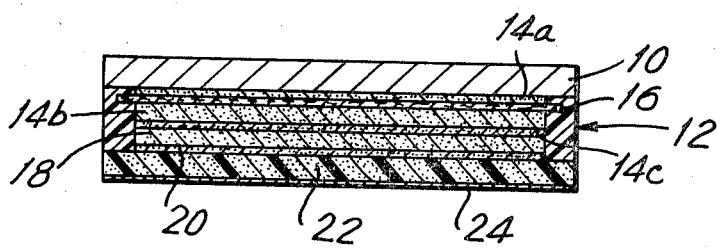
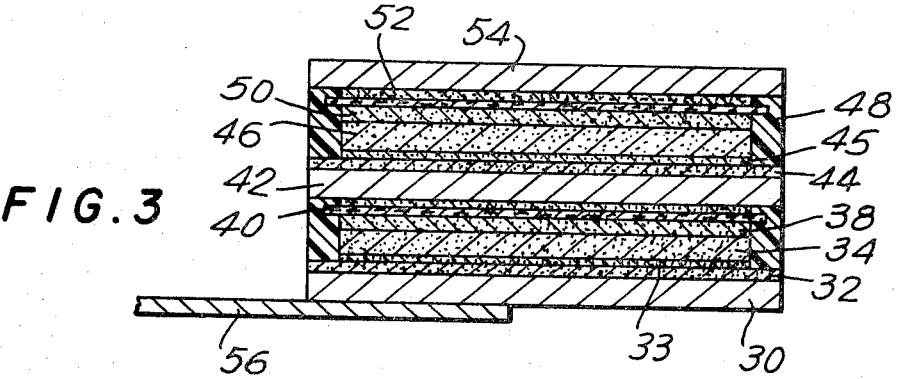
INVENTOR.
WILLIAM H. DEIERHOI, Jr.
BY
ATTORNEY

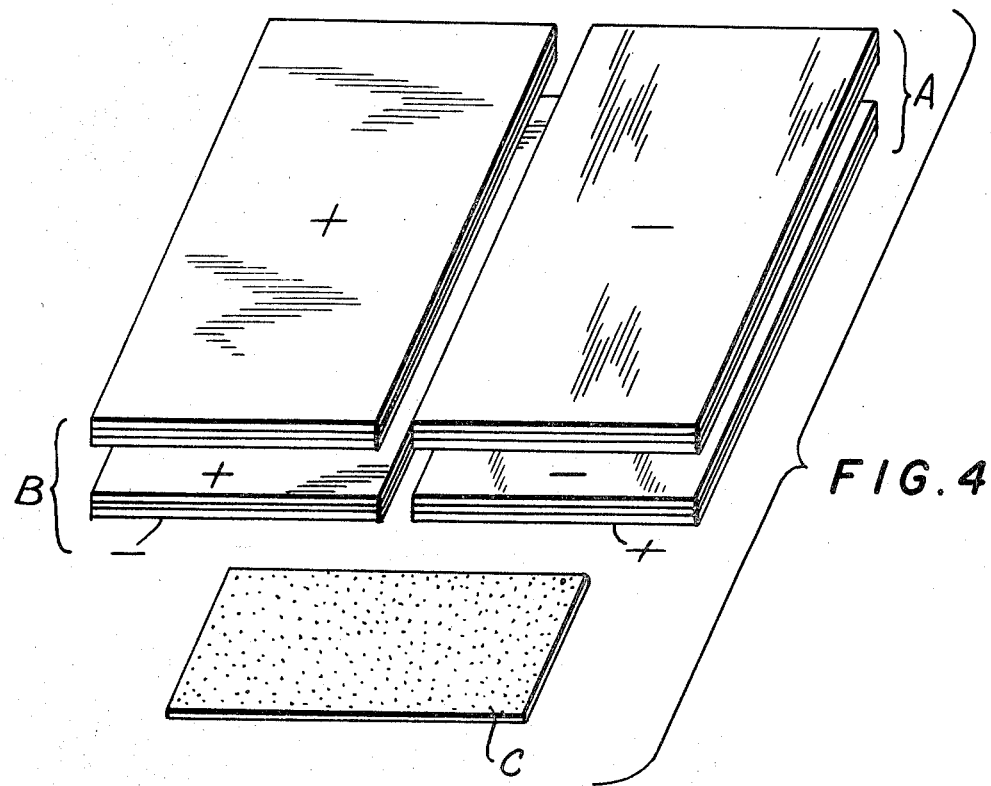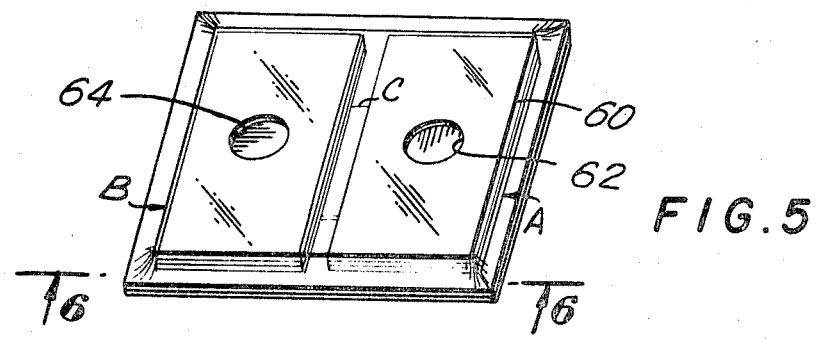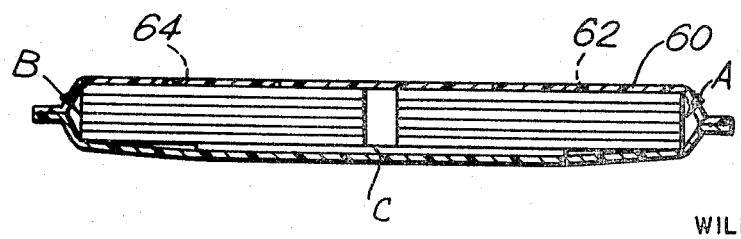

United States Patent Office 3,563,805
Patented Feb. 16, 1971

3,563,805
THIN, FLAT PRIMARY CELLS AND BATTERIES
William H. Deierhoi, Jr., Westlake, Ohio, assignor to Union Carbide Corporation, New York, N.Y., a corporation of New York
Filed Feb. 20, 1969, Ser. No. 800,986
Int. Cl. H01m 21/04
U.S. Cl. 136—111                                9 Claims

ABSTRACT OF THE DISCLOSURE

A thin, flat primary cell has an internal cathode confining frame to which a sheet metal anode and a cathode collector are sealed. The frame in cooperation with a tacky, immobilized adhesive electrolyte aids in maintaining low resistance contact between cell elements and also in conjunction with the anode and cathode collector serves to rigidify the cell. A battery of such cells in series relation includes two interconnected stacks.

---

This invention relates to thin, flat primary galvanic cells and batteries.

The continuing development of "personal" portable electrically operated devices of compact design such as tape recorders and playback machines, radio transmitters and receivers, shavers, watches, and motion picture or still cameras creates a continuing demand for the development of reliable, compact batteries for their operation. The power needs of such devices are varied. Thus, a watch requires a battery which will perform uniformly for at least a year at low drain, while recorders and radios require batteries which will operate intermittently for perhaps a half hour to several hours at substantially higher drains followed by longer periods of nonuse. A motion picture camera in which a battery may operate exposure control means as well as drive a motor usually requires the battery to operate in a repetitive series of relatively short periods of time in a given day, but may not be used for weeks or months. A still camera in which a battery may be used to fire a flash bulb and in some cases to control exposure means and advance the film after each exposure, requires the battery to deliver a series of pulses of rather high current, frequently in rapid succession.

While the battery industry has been quite successful in providing batteries to satisfy these diverse demands, the vast majority of the batteries produced for and used in devices of the type discussed are cylindrical. They may range in height from the familiar "button" cells to as much as one-half inch to one inch or even more and in diameter from roughly about one-half inch to one inch or more. Although they are excellent sources of electricity, their shape has limited to some extent the size and shape of the devices for which they are intended. As design concepts change there is increasing emphasis placed on thin, flat shapes. Devices of thin, flat shape cannot be made to accommodate the familiar cylindrical battery without devoting more space to the battery than is desired. Accordingly, there is an increasing demand for thin, flat batteries.

There has been substantial effort expended in the industry toward the development of flat cells and batteries in the past decade as evidenced by the following United States patents: Arbogast 2,635,128; Nowotny 2,745,894 and 2,798,895; Nagorski 2,847,495; Soltis 2,870,235 and Krueger 2,995,614. All of these patents describe flat cells and batteries thereof and have, in common, a concern for sealing individual cells within an envelope of plastic film. All illustrate and describe a construction in which the envelope for each cell is entirely external of the cell and extends marginally outwardly thereof. When such cells are stacked to form a battery the marginal portions of the cell envelopes present a problem in that they must be accommodated within a battery container or a device in which the battery is to be used, and the space that must be provided to accommodate them is electrically nonproductive.

It is the principal object of this invention to provide thin, flat primary galvanic cells and batteries of such construction that the space they occupy is substantially entirely electrically productive.

In the accompanying drawing:

FIG. 1 is an exploded view in vertical section of parts to be assembled for construction of a primary cell;

FIG. 2 is a vertical section of a cell assembled from the parts of FIG. 1;

FIG. 3 is a vertical section of a battery of cells of somewhat different construction, part being broken away;

FIG. 4 is an exploded view in perspective of cells arranged for assembly into a battery;

FIG. 5 is a perspective view of a battery assembled from the cells of FIG. 4; and FIG. 6 is a sectional view taken along the line 6—6 of FIG. 5 looking in the direction of the arrows.

The invention comprises a thin, flat primary galvanic cell having a sheet metal anode and a cathode of oxidic depolarizer mix with an electrolyte permeable separator therebetween, the cathode being within and bounded by a frame of moisture-impervious sealing material which is marginally sealed to the anode and to a cathode collector which is in intimate contact with the cathode. An immobilized tacky, viscous electrolyte in contact with anode and cathode adhesively secures the two together. All components of the cell are adhesively secured in intimate contact, and no external sealing or pressure-exerting means is employed. The frame of sealing material surrounding the cathode aids to rigidify the cell and in maintaining low electrical resistance contacts between the cell components in cooperation with the sheet metal anode and the cathode collector to which it is marginally sealed. The invention also comprises a battery of such cells arranged in electrical series relation and adhesively secured together without external pressure-applying means. In a preferred embodiment when a battery is to be prepared the cathode collector of one cell is provided as a coating carried on and bonded to a surface of a sheet metal anode for a neighbor cell. The electrolyte for the cell is confined within the space defined by anode, cathode and frame.

Referring to the drawing, there are shown in FIG. 1 a number of component parts for assembly to produce a cell embodying the invention. An anode subassembly comprises an anode 10 of sheet metal; a marginal layer 12a of an adhesive sealing material to be placed on the anode 10; a layer 14a of immobilized electrolyte; a separator 16 with marginal layers 12b, 12c of adhesive, one on each side of the separator 16; and a second layer 14b of electrolyte. A cathode subassembly comprises a layer 14c of electrolyte to be placed adjacent one surface of a cathode 18. A layer 20 of adhesive is provided between the other surface of the cathode 18 and a cathode collector 22. A fourth layer 12d of sealing material is provided to be in contact with the cathode collector 22. A flash coating 24 of highly conductive metal such as gold or silver may be provided for the cathode collector 22.

Reference to FIG. 2 will show that when the various components are assembled the layers 12a, 12b, 12c and 12d of adhesive are joined to form a frame 12 which marginally bounds the cathode 18 and is secured to the anode 10 and cathode collector 22 of the cell. The layers 14a, 14b, 14c of electrolyte provide the cell electrolyte 14 which is in ionic or electrolytic contact with the anode 10 and cathode 18. The separator 16 performs its conventional function of preventing physical contact between anode 10 and cathode 18 and is permeable to the electrolyte.

To provide a battery of cells like that shown in FIG. 2 it is necessary merely to place the anode of one cell in intimate electronic contact with the cathode collector of another thus effecting a series connection. A more desirable construction for a series stack battery is one having a "duplex" electrode in which one surface of a sheet metal anode is provided within a coating of conductive carbonaceous material such as has been used for many years in primary batteries. Such a construction is shown in FIG. 3.

As seen in FIG. 3 two cells are arranged one above the other and adhesively secured together. In the lower cell a sheet metal member 30 has an electronically conductive coating 32 of carbonaceous material bonded to one surface thereof onto which is secured a cathode 34 by a layer 33 of adhesive. The cathode 34 is bounded by a frame 36 of plastic adhesive material marginally secured to the coating 32. A layer 38 of electrolyte surmounts the cathode 34 and is in ionically conductive contact therewith and with a separator 40 above it. Also in ionically conductive contact with the separator 40 is a sheet metal anode 42 the marginal portions of which are secured to the frame 36 of adhesive material. On the upper surface of the anode 42 is a layer 44 of conductive carbonaceous material which serves as the cathode collector for the upper cell. The upper cell includes a cathode 46 bounded by a frame 48 of adhesive sealing material and secured to the cathode collector 44 by a layer 45 of adhesive. A layer 50 of electrolyte is provided in contact with a separator 52 to which is adhesively affixed a sheet metal anode 54 the marginal portions of which are bonded to the frame 48. The stack of cells is thus connected in series relationship. It is secured to a conductor 56 which may, if desired, be connected to a second stack of cells.

In FIG. 4 there is shown diagrammatically an arrangement of cells embodying the invention in which two stacks of two cells each are arranged side by side. As shown the right hand stack, stack A is arranged with the negative terminal of both cells uppermost and the left hand stack, stack B is arranged with the positive terminal of both cells uppermost. Connection between the stacks is made by the conductive strip C which is adhesively secured to the bottoms of the stacks as may be seen in FIG. 5. For certain uses, the assembled battery is desirably sealed within an envelope 60 of electrically insulating thermoplastic film having apertures 62, 64 therein for making electrical contact to the two stacks of cells.

Although the invention is as indicated primarily concerned with construction of cells and batteries it is pointed out that the construction lends itself to use with materials used in conventional battery systems. Thus, a preferred system is that employing a zinc anode, a manganese dioxide containing cathode and a carbonaceous cathode collector. The preferred electrolyte is an immobilized aqueous solution of ammonium chloride and zinc chloride in conventional proportions. The separator preferred is a good grade of microporous paper, for instance typified by that referred to as bible paper in the art.

The invention will be described hereinafter with particular reference to the Leclanche system or modifications thereof, but it is again pointed out that other anodes than zinc may be used, for instance magnesium, aluminum or other metal used in primary cells and that other cathodes than manganese dioxide may be used so long as they are compatible with the selected anode. The choice of electrolyte will be determined by the choice of anode and cathode. These selections form no part of the invention and it is not limited to them. The adhesive used to form the frame must not react with cell components or reaction products, should be electrolyte-proof and impermeable to water and oxygen transfer and should retain these properties and its adhesivity over the range of cell temperature operation. Vinyl adhesives have been used in batteries for many years and they are suitable for use in the invention. Hot melt adhesives of vinyl-wax mixtures are suitable as well.

An important feature of construction of cells and batteries in accordance with the invention is that it permits the use of electrolytes which are aqueous solutions and thus to maintain wet contact between appropriate cell elements. The electrolyte is immobilized by a thickening agent to produce a viscous tacky or "sticky" mass which can be held within the bounds of the adhesive frame without leakage from the cell. In the thin, flat cells of the invention this mass in addition to providing the electrolyte serves to hold the cell components together and the internal frame in cooperation with the anode member and cathode collector serve to maintain good, low resistance contact throughout the cell and to rigidify it.

Conventional thickeners for Leclanche cells include starches such as corn starch, wheat starch, potato starch, natural gums such as locust bean gum, guar gum, gum arabic, and materials usch as methyl cellulose, carboxymethyl cellulose and hydroxyethyl cellulose. Vinyl polymers, for instance polyacrylamide, polyacrylic acid, polyvinyl pyridine, polyvinyl methyl ether and acrylates such as methyl methacrylate have also been considered for use with Leclanche electrolytes, and any may be used in making cells embodying this invention. Because the viscosity of electrolytes containing vinyl polymers can be controlled readily by the degree of polymerization in aqueous solution the vinyl polymers are particularly well suited for electrolyte immobilization in the cells of the invention. Of the thickening agents maintained, polyacrylamide is presently preferred. The thickened electrolyte should have a viscosity in the range 400 to 3000 cps.

A large number of cells and batteries embodying the invention have been made and tested with good results. For example in one series of tests cells of the general configuration and construction shown in FIGS. 1 and 2 were made utilizing a zinc anode 2 inches by 3 inches and 0.008 inch thick. The zinc was of high purity (99.99%) and one surface was amalgamated in conventional manner. A marginal layer of a vinyl adhesive was provided on the amalgamated surface by stencil. In some cases the margin was ¼ inch wide, in others $5/32$ inch. A thin layer of polyacrylamide-thickened electrolyte was brushed onto the amalgamated surface of the anodes. The electrolyte contained 24% ammonium chloride, 6.5% zinc chloride and 3.3% polyacrylamide by weight in aqueous solution. Its viscosity was about 2300 cps. To both sides of a rag paper sheet 0.001 inch in thickness and 2 inches by 3 inches were applied marginal layers of the vinyl adhesive which had been applied to the zinc anode. The adhesive layers were dried by heating the paper in an oven in air at about 135° C., and the separator was then placed on the electrolyte-coated anode with the adhesive margins congruent to complete the anode assembly, care being taken to press the separator firmly against the wet electrolyte to eliminate air bubbles. A layer of the same electrolyte was then applied to the upper surface of the separator.

The cathode subassembly was prepared by providing as a cathode collector a sheet of electrically conductive vinyl film sold under the "Condulon," the sheet being of the same dimensions as the anode and 0.007 inch in thickness. Onto one side of this film was vacuum deposited a flash coating of gold. Onto the marginal portion of the other side (uppermost) was deposited a layer of the vinyl adhesive used in the preparation of the anode assembly and of the same dimensions. Within the boundaries of this deposit was placed a layer of an aqueous solution of polyacrylamide containing finely divided graphite, the layer serving as an adhesive for securing the cathode to the collector. It contained 5.5% polyacrylamide and 4 parts by weight of graphite with 1 part by weight of acetylene black. This layer was dried in air at 70° C. Onto this adhesive layer was then placed the cathode mix. The cathode mix was conventional containing finely divided manganese dioxide, about 18% finely divided carbonaceous material to improve conductivity and about 1% binder. It was wet with electrolyte. In some cases, the mix was applied in successive layers and in others in one layer. In any event care was taken to deposit only within the boundaries of the vinyl adhesive margins. After application, the cathode was dried by heating in air at about 135° C., and a layer of electrolyte of the same composition above described was applied to its upper surface to complete the cathode subassembly.

To complete the cell the anode and cathode subassemblies were pressed together while the electrolyte layers on the separator and the cathode mix were wet and tacky. Care was taken to remove residual air and to align all of the layers of vinyl adhesive. When this had been accomplished the assembled cell was maintained in position and heat and pressure were applied to the marginal portions to seal all of the marginal layers of adhesive together. The overall thickness of cells produced as described ranged from about 0.035 inch to 0.045 inch, variation being due to the use of thicker cathodes in some cases.

Performance tests of cells constructed in the manner described having a thickness of 0.045 inch, and a cathode weight of 1.2 grams, an anode weight of 5.8 grams and an active area of 4.0 square inches show the cells to have a nominal open circuit voltage of 1.6 volts, a theoretical zinc capacity of 4.82 ampere hours and a theoretical manganese dioxide capacity of 0.29 ampere hours. Typical voltage and current density characteristics at various loads are tabulated.

TABLE I

| Load, ohms: | Closed circuit voltage | Current density, ma./in.$^2$ |
| --- | --- | --- |
| 10 | 1.56 | 43 |
| 5 | 1.53 | 85 |
| 2 | 1.46 | 185 |
| 1 | 1.36 | 386 |
| 0.5 | 1.19 | 699 |

In other tests, cells of 4.0 square inches active area have delivered 1.5 amperes for pulses of 1.25 seconds duration with 5 seconds recycling. The current density under load was 0.375 ampere per square inch. In some cells twenty such pulses were delivered before voltage fell to 1.0 volt. For a specific requirement, pulses of 1.2 amperes for 1.1 seconds are called for with a 3 to 5 seconds recycle, and the cells are required to deliver ten pulses of this character over a temperature range of 30° to 120° F. Cells of the invention more then met this test as will be seen. In some tests as many as fifty pulses have been obtained.

Other tests have shown that cells constructed in accordance with the invention are capable of delivering required voltage at lower drains for long periods of time. For extra protection against loss of moisture from the cells utilizing the electrolyte described herein, a conventional hot melt adhesive may be used instead of the vinyl solution adhesive employed in the example.

Also, as indicated above, if series connected batteries are to be constructed in accordance with the invention, it is preferred that duplex electrodes be used. If unit cells are used and joined by an adhesive, the use of an ionically conductive-adhesive can lead to the production of couples between dissimilar metals in anode and cathode, and if the adhesive is only electronically conductive there may be poor contact unless the surfaces are substantially perfect. The duplex electrode avoids these difficulties.

A number of cells utilizing duplex electrodes have been made having the configuration of FIG. 3. In such cells a zinc anode of 0.011 inch thickness was used. A conductive carbonaceous paint baked on the anode to provide a cathode collector was 0.004 inch thick and the cathode thickness was 0.015 inch. The total thickness of a two cell stack as depicted in FIG. 3 was 0.083 inch including an 0.004 inch thick conductor strip. Batteries constructed of these cells and enveloped in a vinyl packaging film had an overall thickness of 0.097 inch.

It will be seen from the above that the invention provides a construction of thin, flat primary cells capable of delivering desired voltages even under heavy loads. The construction is such that there is little or no electrically nonproductive space. Moreover, the internal frame combined with the use of a tacky, adhesive electrolyte maintains excellent intracell contact and minimizes the danger of leakage despite the thinness of the cell. It is pointed out that no external wrapper is needed for the cell or batteries thereof. In some cases, however, for instance if batteries embodying the invention are to be maintained for long periods of time in expensive devices it is advisable that the battery have an outer envelope as shown in FIG. 5 to protect the battery against loss of moisture and the device against damage by loss of moisture from the battery. By reason of the construction of the individual cells, such an outer wrapper may be used without the sacrifice of significant space.

The characteristics of cells and batteries embodying the invention recommend their use in a variety of application, for instance in the devices above enumerated. In small sizes they may be used to power watches being attached for example to the cover of the watch case. Another application for batteries embodying the invention is in conjunction with film cartridges for cameras, for instance magazines for motion picture cameras and packs for film-pack cameras. Being thin and flat they may be secured to such containers. Being flexible, they may be deformed to fit if desired. Other uses will suggest themselves.

Similarly, although specific materials have been described herein in connection with cells and batteries embodying the invention, those materials as well as dimensions have been recited by way of example and the possibility of use of other materials and/or dimensions will be apparent to those skilled in the art.

What is claimed is:
1. A thin, flat primary galvanic cell having:
a sheet metal anode;
a cathode of oxidic depolarizer mix;
an electrolyte-permeable separator between said anode and said cathode;
an immobilized tacky electrolyte in contact with said anode and said cathode;
and a cathode collector;
said electrolyte adhesively securing said anode to one surface of said cathode and said cathode collector being adhesively secured to the opposite surface of said cathode;
said cathode, separator, and electrolyte being within and bounded by a peripheral frame of moisture-impervious sealing material, said frame being marginally adhered to said anode and said cathode collector and coextensive with the outermost edges thereof;
all of said components of said cell being adhesively secured together and said marginally situated seal in cooperation with said sheet metal anode and said cathode collector aiding in maintaining relatively low electrical resistance contact between said individual cell components.
2. A cell as defined by claim 1 in which said marginal seal material is a vinyl adhesive.
3. A cell as defined by claim 1 in which said marginal seal material is a hot-melt adhesive.
4. A cell as defined by claim 1 in which said sheet metal anode is zinc, said cathode consists essentially of manganese dioxide and said electrolyte is an aqueous solution of ammonium chloride and zinc chloride immobilized in a paste of vinyl polymer.

5. A cell as defined by claim 4 having a maximum thickness of 0.05 inch.

6. A primary galvanic battery comprising a stack of cells as defined by claim 1 arranged in and adhesively secured in electrical series relation without external bonding means.

7. A battery as defined by claim 6 in which the cathode collector of one cell is an electronically conductive coating on one surface of the anode of a neighbor cell in said stack.

8. A battery as defined in claim 6 in which said cells are arranged in a plurality of stacks side by side, each said stack being connected in series.

9. A battery as defined by claim 8 in which said stacks are enveloped in an electrically nonconducting thermoplastic film having apertures therein for providing for electrical connection to each of said stacks.

References Cited

UNITED STATES PATENTS

| | | | |
|---|---|---|---|
| 2,229,431 | 1/1941 | Young | 136—111.5 |
| 2,483,983 | 10/1949 | Quinnell | 136—111.5 |
| 2,745,894 | 5/1956 | Nowotny | 136—111 |
| 2,880,259 | 3/1959 | Nowotny | 136—111 |
| 3,004,094 | 10/1961 | Haessly | 136—111 |
| 3,353,999 | 11/1967 | Osborn | 136—111 |
| 3,370,298 | 2/1968 | Balaguer | 136—111 |

ALLEN B. CURTIS, Primary Examiner

C. F. LEFEVOUR, Assistant Examiner

U.S. Cl. X.R.

136—133